US008038094B2

(12) United States Patent
Oyama

(10) Patent No.: US 8,038,094 B2
(45) Date of Patent: Oct. 18, 2011

(54) HYDRAULIC SYSTEM FOR AIRCRAFT

(75) Inventor: Hiroki Oyama, Summerfield, NC (US)

(73) Assignee: Honda Motor Co., Ltd., Tokyo (JP)

( * ) Notice: Subject to any disclaimer, the term of this patent is extended or adjusted under 35 U.S.C. 154(b) by 313 days.

(21) Appl. No.: 12/413,818

(22) Filed: Mar. 30, 2009

(65) Prior Publication Data
US 2009/0242694 A1 Oct. 1, 2009

Related U.S. Application Data

(60) Provisional application No. 61/040,875, filed on Mar. 31, 2008.

(51) Int. Cl.
B64C 13/36 (2006.01)
B64C 25/42 (2006.01)
(52) U.S. Cl. ............ 244/99.6; 244/99.4; 244/99.5; 244/99.7; 244/111; 60/404
(58) Field of Classification Search ............ 244/99.4, 244/99.5, 99.6, 99.7, 100 R, 102 R, 111; 60/403–405; 91/509
See application file for complete search history.

(56) References Cited

U.S. PATENT DOCUMENTS

| 3,039,719 | A |   | 6/1962  | Platt            |         |
|-----------|---|---|---------|------------------|---------|
| 3,464,319 | A |   | 9/1969  | Sherman          |         |
| 3,527,143 | A |   | 9/1970  | Hayter           |         |
| 3,680,311 | A | * | 8/1972  | Harbonn et al.   | 60/404  |
| 3,901,342 | A | * | 8/1975  | Nunn, Jr.        | 180/407 |
| 3,926,124 | A | * | 12/1975 | Frank            | 104/26.2|
| 3,955,783 | A |   | 5/1976  | Glaze et al.     |         |
| 3,995,800 | A |   | 12/1976 | Swogger          |         |
| 4,065,094 | A | * | 12/1977 | Adams            | 251/26  |
| 4,286,432 | A | * | 9/1981  | Burrows et al.   | 60/404  |
| 4,348,155 | A |   | 9/1982  | Barnes et al.    |         |
| 4,425,006 | A |   | 1/1984  | Bertrand et al.  |         |
| 4,428,196 | A |   | 1/1984  | Boehringer       |         |
| 4,695,226 | A |   | 9/1987  | Marchitto et al. |         |
| 4,704,865 | A |   | 11/1987 | Archung          |         |
| 4,731,997 | A | * | 3/1988  | Hagin            | 60/416  |
| 4,754,940 | A |   | 7/1988  | Deter            |         |
| 5,100,082 | A |   | 3/1992  | Archung          |         |
| 5,301,505 | A | * | 4/1994  | Wright           | 60/405  |
| 5,397,173 | A | * | 3/1995  | Bourguet         | 303/2   |
| 6,755,375 | B2|   | 6/2004  | Trikha           |         |

(Continued)

FOREIGN PATENT DOCUMENTS

GB        792905        4/1958

(Continued)

Primary Examiner — Michael Carone
Assistant Examiner — Joshua Freeman
(74) Attorney, Agent, or Firm — Rankin Hill & Clark LLP

(57) ABSTRACT

A hydraulic system for aircraft operating devices provides a secondary pressure source for direction and deceleration control in case of loss of pressure from a primary pressure source. The system includes multiple pressure accumulators that include a primary accumulator, which supplies pressurized fluid to a first actuator, and first and second secondary accumulators, which supply pressurized fluid to second and third actuators, respectively. If the primary accumulator is disabled, the first secondary accumulator will supply pressurized fluid to the first actuator. If the first secondary accumulator is disabled, the second secondary accumulator will supply pressurized fluid to the second actuator. By providing multiple, substantially independent accumulators, direction and deceleration control is maintained even in the event of loss of the primary accumulator.

20 Claims, 2 Drawing Sheets

U.S. PATENT DOCUMENTS

| | | | |
|---|---|---|---|
| 6,926,500 B2 * | 8/2005 | Ferullo .................... | 416/107 |
| 6,966,614 B2 * | 11/2005 | Hamzeh et al. ............ | 303/10 |
| 2002/0057012 A1 | 5/2002 | Bourguet et al. | |
| 2003/0167763 A1 * | 9/2003 | Farkas ...................... | 60/428 |
| 2004/0075020 A1 | 4/2004 | Trikha | |
| 2004/0245386 A1 * | 12/2004 | Huynh .................... | 244/75 R |
| 2005/0011188 A1 * | 1/2005 | Silva et al. ................ | 60/405 |
| 2005/0194495 A1 | 9/2005 | Seung | |
| 2006/0226285 A1 * | 10/2006 | Matsui .................... | 244/99.6 |
| 2007/0069071 A1 | 3/2007 | Near et al. | |

FOREIGN PATENT DOCUMENTS

| | | |
|---|---|---|
| GB | 805139 | 12/1958 |
| RU | 1839990 | 6/2006 |

* cited by examiner

HYDRAULIC SYSTEM FOR AIRCRAFT

FIELD OF THE INVENTION

The present invention relates to aircraft control systems and, more particularly, to a hydraulic system providing redundant operation to permit continued operation in the event of failure of one or more hydraulic system components.

BACKGROUND

As will be appreciated, numerous abnormal conditions may occur in flight that could lead to complete or partial failure of a jet aircraft's hydraulic system. For example, if one of the turbine engines should experience a catastrophic failure (e.g., rotor burst), turbine blade or blade fragments could be hurled into the fuselage causing extensive damage to the hydraulic system. Such damage could include disabling of the hydraulic pump, accumulator failure, and severing of hydraulic lines. Further, hydraulic lines, motors, pumps, and/or accumulators may fail during flight, and result in partial or complete failure of the hydraulic system.

To deal with such abnormal conditions, redundancy in the system is desired so that the various devices operated by the hydraulic system have an alternate source of operating pressure, at least sufficient to operate the devices through several cycles.

In larger jet aircraft, redundancy is achieved through the use of redundant hydraulic systems, including multiple pumps, multiple reservoirs and multiple fluid lines for each device to be operated. These complex redundant systems are effective but add weight to the aircraft and take up considerable space. Such systems are not practical for use in smaller jet aircraft.

Because smaller jet aircraft are relatively light, they can use purely mechanical linkages (e.g., cables, push-pull rods, etc.) for operating in-flight control devices such as ailerons, elevators, and rudders. Nevertheless, smaller jet aircraft typically require a power system or systems to operate devices that control landing gear extension and retraction, main landing gear wheel brakes, nose wheel steering and speed brake deployment and retraction, for example.

These circumstances necessitate a new type of hydraulic system that provides for continued operation of the direction and deceleration control devices in the event of an abnormal condition. Accordingly, a new approach for the hydraulic system is required so as to provide the redundancy necessary to assure safe operation in emergencies.

SUMMARY

The present invention is directed toward a hydraulic system that allows for continued operation of direction and deceleration control devices in the event of failure of one or more components of the hydraulic system.

In accordance with the present invention, an aircraft hydraulic system includes a plurality of hydraulic actuators for respective aircraft operating devices, including a first actuator, a second actuator, and a third actuator, and a plurality of hydraulic pressure accumulators, including a primary accumulator and first and second secondary accumulators.

In further accordance with the present invention, the primary accumulator delivers pressurized fluid to the first actuators and the secondary accumulators. In the event that the primary accumulator fails to provide fluid at an operating pressure to the first actuator, the first secondary accumulator may be fluidly connected to the first actuator. Furthermore, upon loss of operating pressure to the second actuator from the first secondary accumulator, the second secondary accumulator may be connected to the second actuator. The first actuator includes a main landing gear and nose gear extension and retraction actuators. The second actuator includes a main landing gear wheel brake actuator. The third actuator includes a nose wheel steering actuator.

In further accordance with the present invention, an aircraft incorporating the present invention includes a pair of jet engines, each of the engines has a rotor and defines a rotor burst zone in which damage to a fuselage may be experienced should the rotor burst. The primary and the first and secondary accumulators are each disposed outside of the rotor burst zone, but at least the primary accumulator supplies pressurized fluid to first actuators via hydraulic lines that pass into the rotor burst zone. The first secondary accumulator supplies pressurized fluid to the second actuator via hydraulic lines that may pass through the rotor burst zone, while the second secondary accumulator supplies pressurized fluid to the third actuator via hydraulic lines that do not pass into the rotor burst zone. As such, one of the secondary accumulators is expected to be available to supply pressurized fluid to the second actuators, and thereby allow for direction and deceleration control even in the event of a rotor burst.

BRIEF DESCRIPTION OF THE DRAWINGS

These and further features of the invention will be apparent with reference to the following description and drawings, wherein.

DETAILED DESCRIPTION

Referring more particularly to the drawings, there is shown in schematic form a hydraulic system 10 embodying the invention and being capable of continued safe operation of the aircraft 100 despite the occurrence of an abnormal condition. As used herein the term "abnormal condition" is meant to refer to failure of one or more components of the hydraulic system, which could be due to mechanical failure of the component (e.g., pump failure, motor failure, accumulator leak, hydraulic line leak, etc.) or due to damage resulting from a catastrophic event, such as a rotor burst. The aircraft devices to be operated by the system include the mechanism for extension and retraction of the landing gear, main landing gearwheel brakes, emergency/parking brakes, speed brakes and nose wheel steering. As will be described below, all of these devices except the speed brake have a backup source of hydraulic pressure in case of pressure failure from their normal source. The backup source has sufficient residual volume and pressure to operate the particular device or devices through several cycles either while the aircraft is in flight or on the ground.

Figure 1:
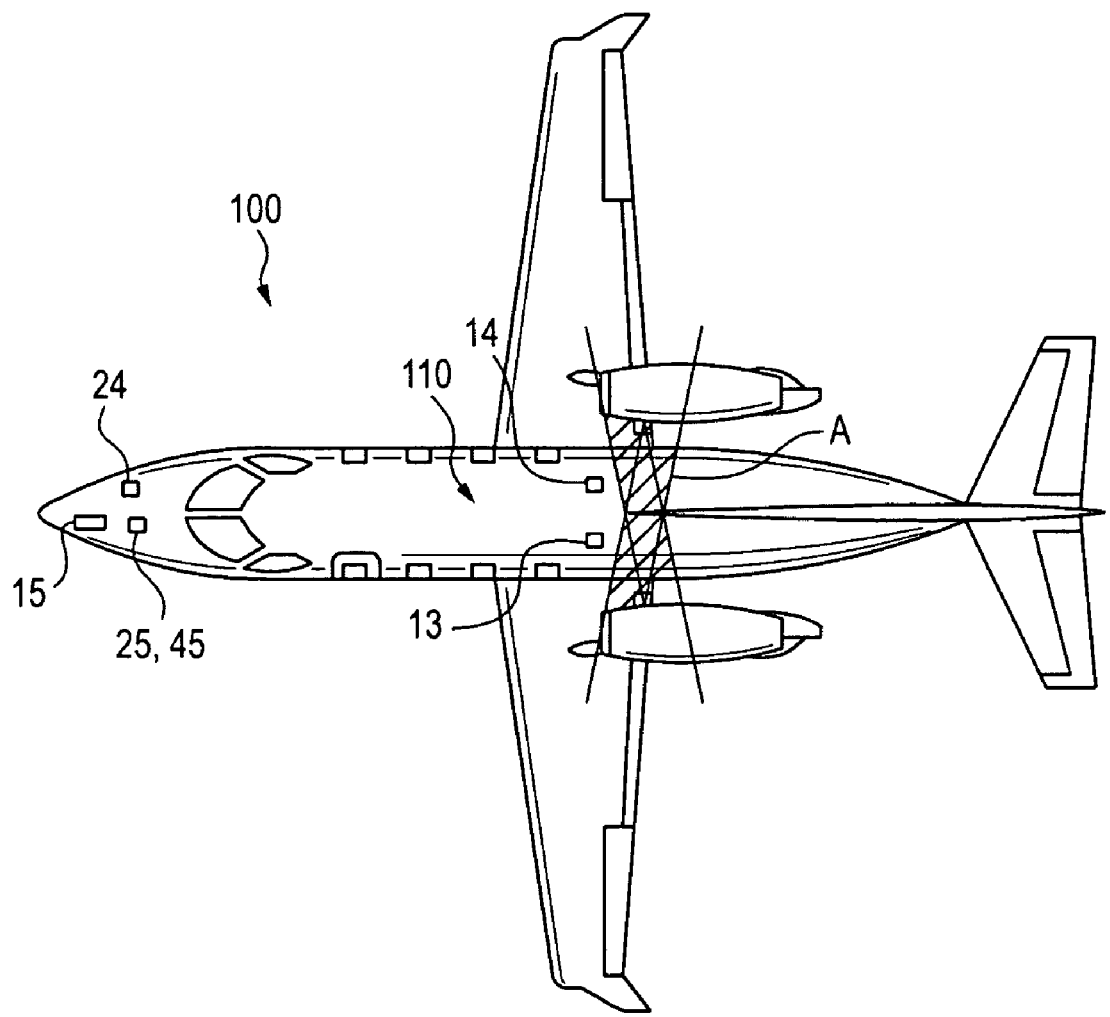
FIG. 1 is schematically illustrates a jet aircraft and locations of hydraulic system components therein; and, FIG. 2 is a schematic diagram of a hydraulic system according to the present the invention.

In order to assure the availability of hydraulic pressure, the system provides multiple pressure accumulators, all pressurized by the same hydraulic pump. With reference to FIG. 1, the accumulators 13, 14, 15 are positioned at locations spaced from one another in the aircraft 100, and preferably spaced from area (A) of the fuselage 110 that may be subject to damage during a catastrophic failure, or bursting, of a rotor. For example, a primary accumulator 13 may be disposed forward of a rotor burst zone (A), adjacent one of the secondary accumulators 14, while another secondary accumulator 15 may be disposed near a nose of the aircraft 100. As such, should a rotor burst event occur and cause damage to the fuselage 110 and hydraulic system components, such as the hydraulic pump, motor, and/or associated hydraulic lines disposed within the rotor burst zone (A), which may result in leakage and failure of the primary accumulator 13, at least one of the other secondary accumulators 14, 15 would be expected to functionally survive the event and continue to provide operating pressure to the devices.

Figure 2:
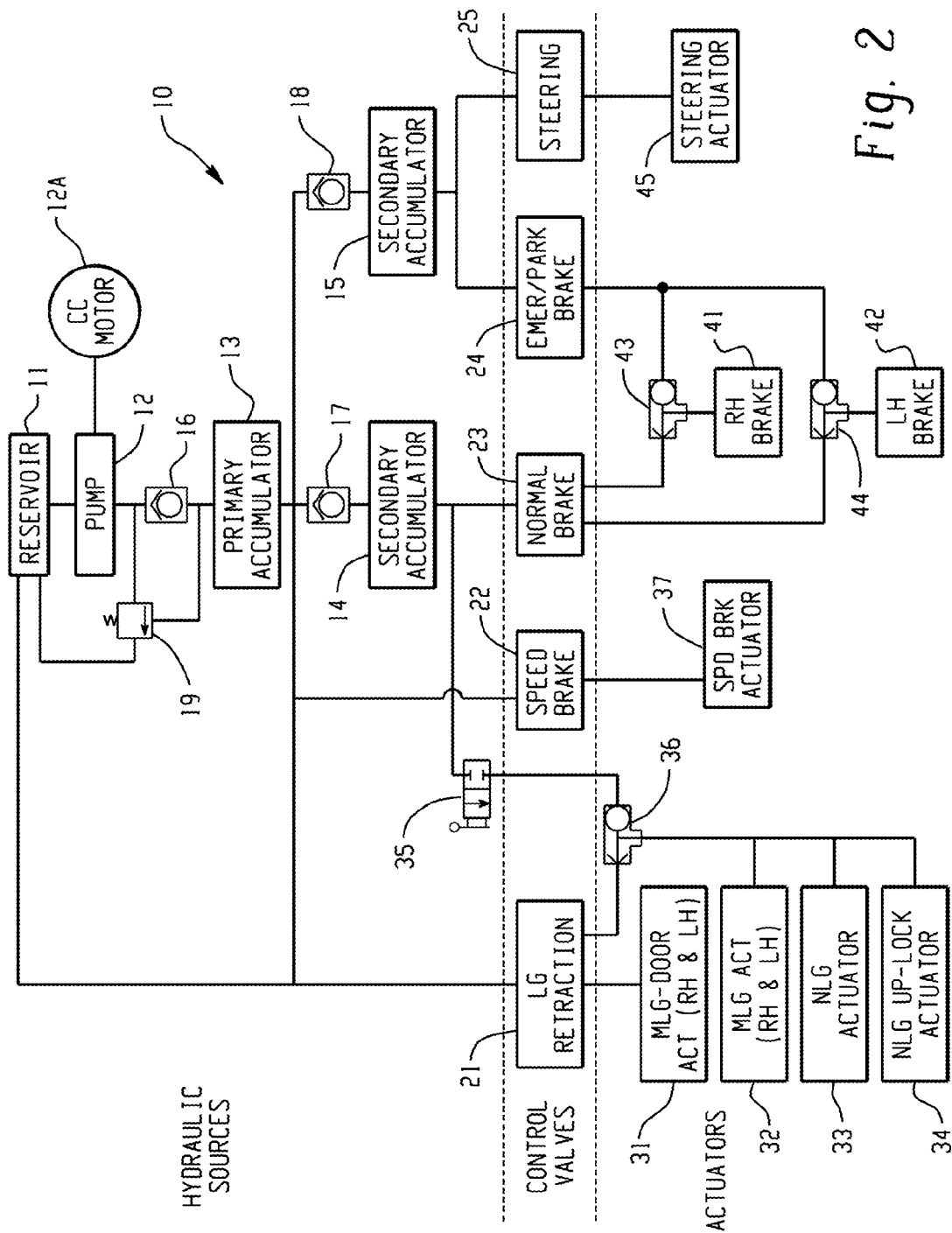

More particularly, with reference to FIG. 2, the system 10 includes a hydraulic reservoir 11, a pump 12 driven by a 28 volt DC motor 12a, a primary accumulator 13 and two secondary accumulators 14, 15 that are pressurized through the primary accumulator 13. Check valves 16, 17, 18 prevent loss of pressure from the respective accumulators 13, 14, 15 back through their supply lines. An unloading valve 19 returns fluid back to the reservoir 11 when an overpressure condition develops in the primary accumulator 13, such as when the motor 12a fails to shut off.

According to one exemplary embodiment, the primary accumulator 13 is maintained at a pressure of between about 1500 psi to 2950 psi and has a volume of about 50 cu. in. The secondary accumulator 14 is maintained at a pressure of between about 2500 psi to 2950 psi and has a volume of about 100 cu. in. The secondary accumulator 15 is maintained at a pressure of between about 2500 psi to 2950 psi and has a volume of about 50 cu. in.

The accumulators 13, 14, 15 supply fluid pressure to the control valves for the various actuators that operate the devices. The control valves include the landing gear extension and retraction control valve 21, the speed brake control valve 22, the main landing gear wheel brake control valve 23, the emergency wheel brake (or parking brake) control valve 24 and the nose wheel steering control valve 25.

The primary accumulator 13 is connected through the control valve 21 to a main landing gear door accumulator (left and right) 31, a main landing gear extension and retraction actuator (left and right) 32, a nose gear extension and retraction actuator 33, and a nose gear up lock actuator 34. The connection to the actuators 32, 33, 34 is made through a shuttle valve 36 that selectively enables an emergency connection. The shuttle valve 36 is shown in its normal condition. The primary accumulator 13 is also connected to a speed brake actuator 37.

As noted previously, when the aircraft is on the ground it is important to maintain directional and deceleration control over the aircraft. The system arrangement of the present invention provides backup power to maintain directional and deceleration control over the aircraft on the ground.

The first secondary accumulator 14 is connected through the control valve 23 to the main landing gear wheel brake mechanisms 41, 42 and thereby provides both directional control and deceleration control to the aircraft when on the ground. These connections are made through respective shuttle valves 43, 44 that are shown in their normal condition.

The first secondary accumulator 14 is also connected to the actuators 32, 33, 34. Should the primary accumulator 13 no longer supply pressure to the actuators 32-34, the pilot can manually operate an emergency gear extension valve 35 in order to direct fluid pressure from the first secondary accumulator 14 through the shuttle valve 36 (which moves to its emergency condition) to the actuators 32, 33, 34.

The second secondary accumulator 15 is connected through the steering control valve 25 to the nose wheel steering actuator 45 to provide directional control to the aircraft when on the ground. There is no backup source of fluid pressure for the actuator 45. However, should the second secondary accumulator 15 be disabled and lose pressure, the aircraft may be turned right or left while on the ground following landing (i.e., high speed directional control) by using the main landing gearwheel brakes which are powered by the first secondary accumulator 14, as is well known to pilots.

The second secondary accumulator 15 also has an emergency connection through the emergency/parking brake control valve 24 to the main landing gear wheel brakes 41, 42 to provide deceleration control to the aircraft when on the ground. Should the first secondary accumulator 14 be disabled and/or lose pressure, backup pressure would be available automatically from the second secondary accumulator 15 through the emergency/parking brake control valve 24 and the respective shuttle valves 43, 44 to the wheel brakes 41, 42. The emergency/parking brake control valve 24 may also be used to apply the wheel brakes 41, 42. The shuttle valves 43, 44 move to their emergency condition when the emergency brakes are applied.

The hydraulic system thus shown and described provides the redundancy necessary to achieve safe operation in emergencies.

While the invention has been shown and described with respect to a specific embodiment thereof, this is intended for the purpose of illustration rather than limitation and other variations and modifications will be apparent to those skilled in the art, all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A hydraulic system for aircraft operating devices comprising:
   a plurality of hydraulic actuators for respective aircraft operating devices, including at least one first actuator and at least one second actuator, and
   a plurality of hydraulic pressure accumulators, including
      a primary accumulator connected to the at least one first actuator, and
      a first secondary accumulator that receives pressurized fluid from the primary accumulator and which is normally connected to the at least one second actuator;
   and wherein, upon loss of operating pressure from said primary accumulator, said first secondary accumulator is connected to the at least one first actuator.

2. The hydraulic system as defined in claim 1 wherein the primary accumulator is operatively connected to and pressurized by a hydraulic pump driven by an electric motor.

3. The hydraulic system as defined in claim 2 further including at least one third actuator and a second secondary accumulator, wherein said second secondary accumulator receives pressurized fluid from the primary accumulator and is connected to the at least one third actuator, and wherein, upon loss of operating pressure from said first secondary accumulator, said second secondary accumulator is connected to said second actuator.

4. The hydraulic system as defined in claim 3 wherein said hydraulic system is disposed in an aircraft such that said second secondary accumulator is a substantial distance from said first secondary accumulator.

5. The hydraulic system as defined in claim 4 wherein said first secondary accumulator is disposed approximately at a location between wings of said aircraft and said second secondary accumulator is disposed in a fore portion of said aircraft.

6. The hydraulic system as defined in claim 1 further including at least one third actuator and a second secondary accumulator, wherein said second secondary accumulator receives pressurized fluid from the primary accumulator and is connected to the at least one third actuator, and wherein, upon loss of operating pressure from said first secondary accumulator, said second secondary accumulator is connected to said second actuator.

7. The hydraulic system as defined in claim 6 wherein said hydraulic system is disposed in an aircraft such that said second secondary accumulator is a substantial distance from said first secondary accumulator.

8. The hydraulic system as defined in claim 7 wherein said first secondary accumulator is disposed approximately at a location between wings of said aircraft and said second secondary accumulator is disposed in a fore portion of said aircraft.

9. A hydraulic system for aircraft operating devices comprising:
   a plurality of hydraulic actuators for respective aircraft operating devices including a first, second, and third sets of actuators, each including at least one actuator, said first actuator set including main landing gear and nose gear extension and retraction actuators, said second actuator set including a main landing gear wheel brake actuator, and said third actuator set including a nose wheel steering actuator, and
   a plurality of hydraulic pressure accumulators including:
      a primary accumulator connected to the first actuator set;
      a first secondary accumulator connected to the second actuator set, said first secondary accumulator receiving pressurized fluid from said primary accumulator and supplying pressurized fluid to said first actuator set upon loss of operating pressure from the primary accumulator, and
      a second secondary accumulator connected to the third actuator set, said second secondary accumulator receiving pressurized fluid from said primary accumulator and supplying pressurized fluid to said second actuator set upon loss of operating pressure from said first secondary accumulator.

10. A hydraulic system as defined in claim 9 wherein the first accumulator is pressurized by a hydraulic pump driven by an electric motor.

11. A hydraulic system as defined in claim 10 wherein the primary accumulator and the first secondary accumulator are located in an aircraft relatively near one another, and the second secondary accumulator is located in the aircraft relatively remote from the primary accumulator and the first secondary accumulator.

12. The hydraulic system as defined in claim 7 wherein said primary accumulator and first secondary accumulators are disposed approximately at a location between wings of said aircraft and said second secondary accumulator is disposed in a fore portion of said aircraft.

13. The hydraulic system as defined in claim 9, wherein the second actuator is a normal brake control valve that is adapted to control operation of right and left brakes, and thereby provides both directional and deceleration control to the aircraft when on the ground.

14. The hydraulic system as defined in claim 13, wherein the third actuator includes an emergency/parking brake control valve, which provides deceleration control, and a steering control valve, which provides direction control over the aircraft when on the ground.

15. An aircraft including a hydraulic system, said aircraft comprising:
   a pair of jet engines, each of said engines having a rotor and defining a rotor burst zone in which damage to a fuselage may be experienced should said rotor burst;
   a primary accumulator that is disposed outside said rotor burst zone and that supplies pressurized fluid to a plurality of first actuators via hydraulic lines that pass into the rotor burst zone;
   a first secondary accumulator that is disposed outside said rotor burst zone and that supplies pressurized fluid to a second actuator via hydraulic lines that may pass through said rotor burst zone; and,
   a second secondary accumulator that is disposed outside said rotor burst zone and that supplies pressurized fluid to a third actuator via hydraulic lines that do not pass into said rotor burst zone,
   wherein said primary accumulator supplies pressurized fluid to said first and second secondary accumulators, and wherein should said primary accumulator become disabled, said first secondary accumulator will supply pressurized fluid to the first actuators.

16. The aircraft according to claim 15, wherein said second secondary accumulator is disposed relatively farther away from the rotor burst zone than is said primary accumulator.

17. The aircraft according to claim 16, wherein should said first secondary accumulator become disabled, said second secondary accumulator will supply pressurized fluid to said second actuator.

18. The aircraft according to claim 17, wherein said first actuators include main landing gear and nose gear extension and retraction actuators.

19. The aircraft according to claim 18, wherein said second actuator includes a main landing gear wheel brake actuator.

20. The aircraft according to claim 19, wherein said third actuator includes a nose wheel steering actuator.

\* \* \* \* \*